Figure 1:
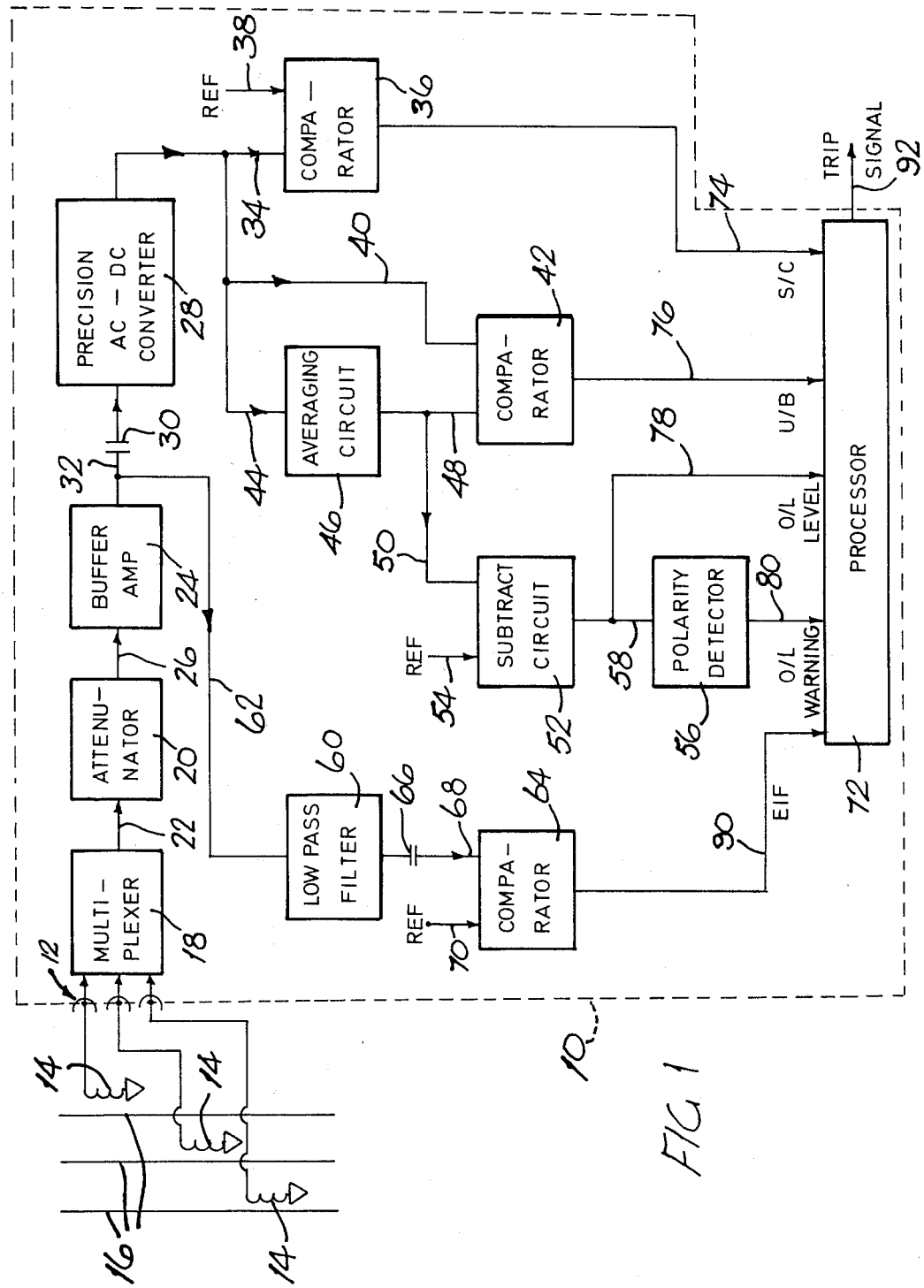

United States Patent [19]

Schonken

[11] 4,241,336
[45] Dec. 23, 1980

[54] METHOD AND APPARATUS FOR MONITORING POLY-PHASE CURRENTS IN POLY-PHASE EQUIPMENT

[75] Inventor: Tobias D. Schonken, Agincourt, Canada

[73] Assignee: Multilin Inc., Agincourt, Canada

[21] Appl. No.: 960,434

[22] Filed: Nov. 13, 1978

[30] Foreign Application Priority Data

Nov. 14, 1977 [GB] United Kingdom ............... 47366/77

[51] Int. Cl.³ ............................................. G08B 23/00
[52] U.S. Cl. .................................... 340/518; 340/651; 340/652; 340/658; 340/661; 340/664
[58] Field of Search ............... 340/661, 658, 664, 651, 340/518, 310 R, 310 A, 509, 511, 512; 324/107, 51; 179/1.5 A, 1.5 BL; 370/77

[56] References Cited

U.S. PATENT DOCUMENTS

| 1,055,018 | 3/1913 | Burnham | 340/651 |
| 3,939,460 | 2/1976 | Horn et al. | 340/518 |
| 4,032,908 | 6/1977 | Rice et al. | 340/518 |

FOREIGN PATENT DOCUMENTS

| 811337 | 4/1959 | United Kingdom . |
| 935067 | 8/1963 | United Kingdom . |
| 1045498 | 10/1966 | United Kingdom . |
| 1491290 | 11/1977 | United Kingdom . |
| 1501351 | 2/1978 | United Kingdom . |

OTHER PUBLICATIONS

The B. G. Def. Pub.: Gaither IV, et al., Def. Pub. of S.N. 573227 filed 8-18-66, published in 861 06.367, on 4-8-69, Def. Pub. No. T861,017.

Primary Examiner—John W. Caldwell, Sr.
Assistant Examiner—Daniel Myer
Attorney, Agent, or Firm—Staas and Halsey

[57] ABSTRACT

A method of and a device for monitoring poly-phase currents in poly-phase equipment, in which a phase signal representative of the current in each phase of the equipment is obtained, the phase signals multiplexed so as to obtain a single multiplexed signal, and the multiplexed signal then processed to extract from it an output signal or signals representative of, for example, overload, unbalance, earth fault or short circuit conditions.

31 Claims, 7 Drawing Figures

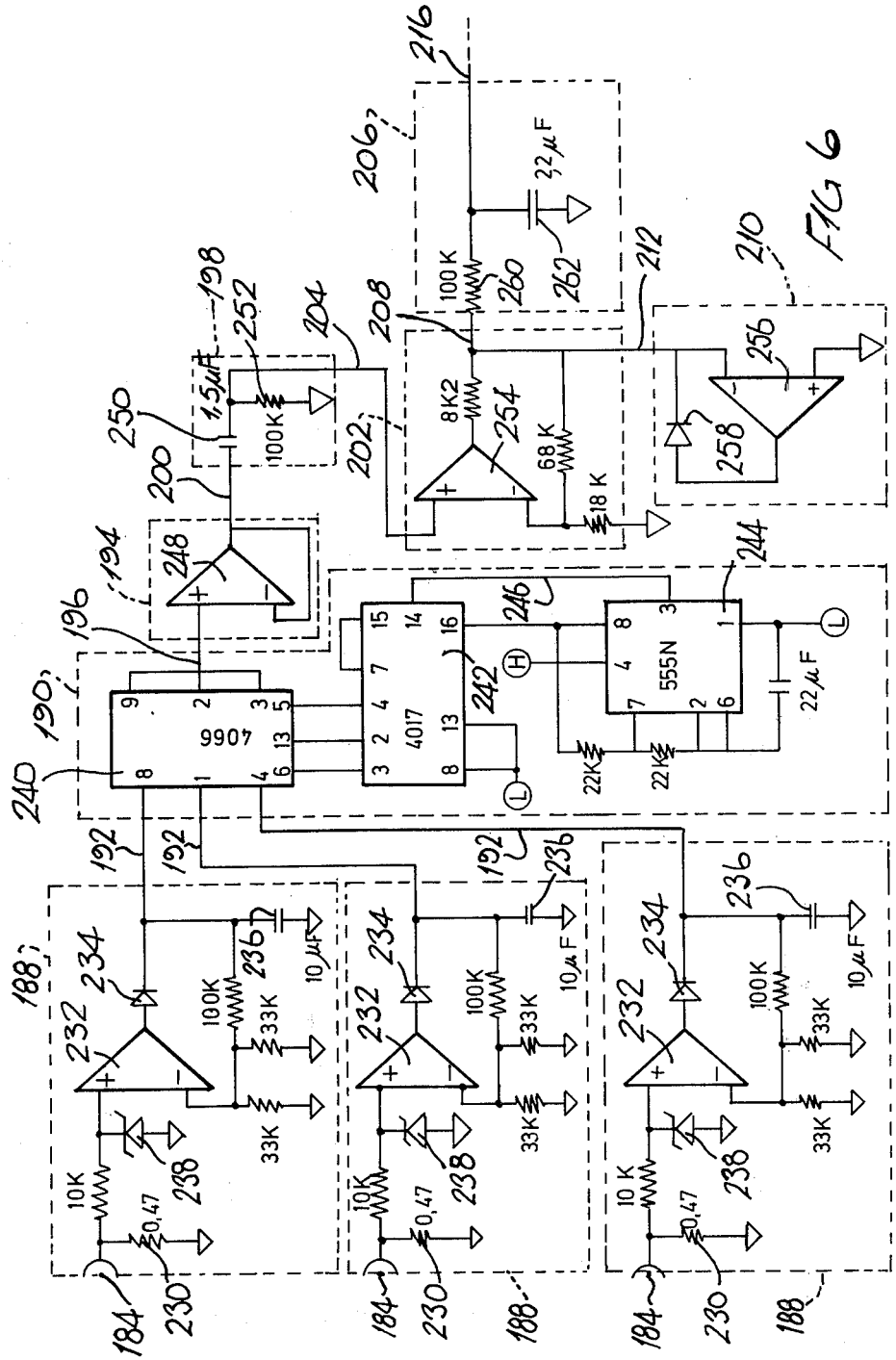

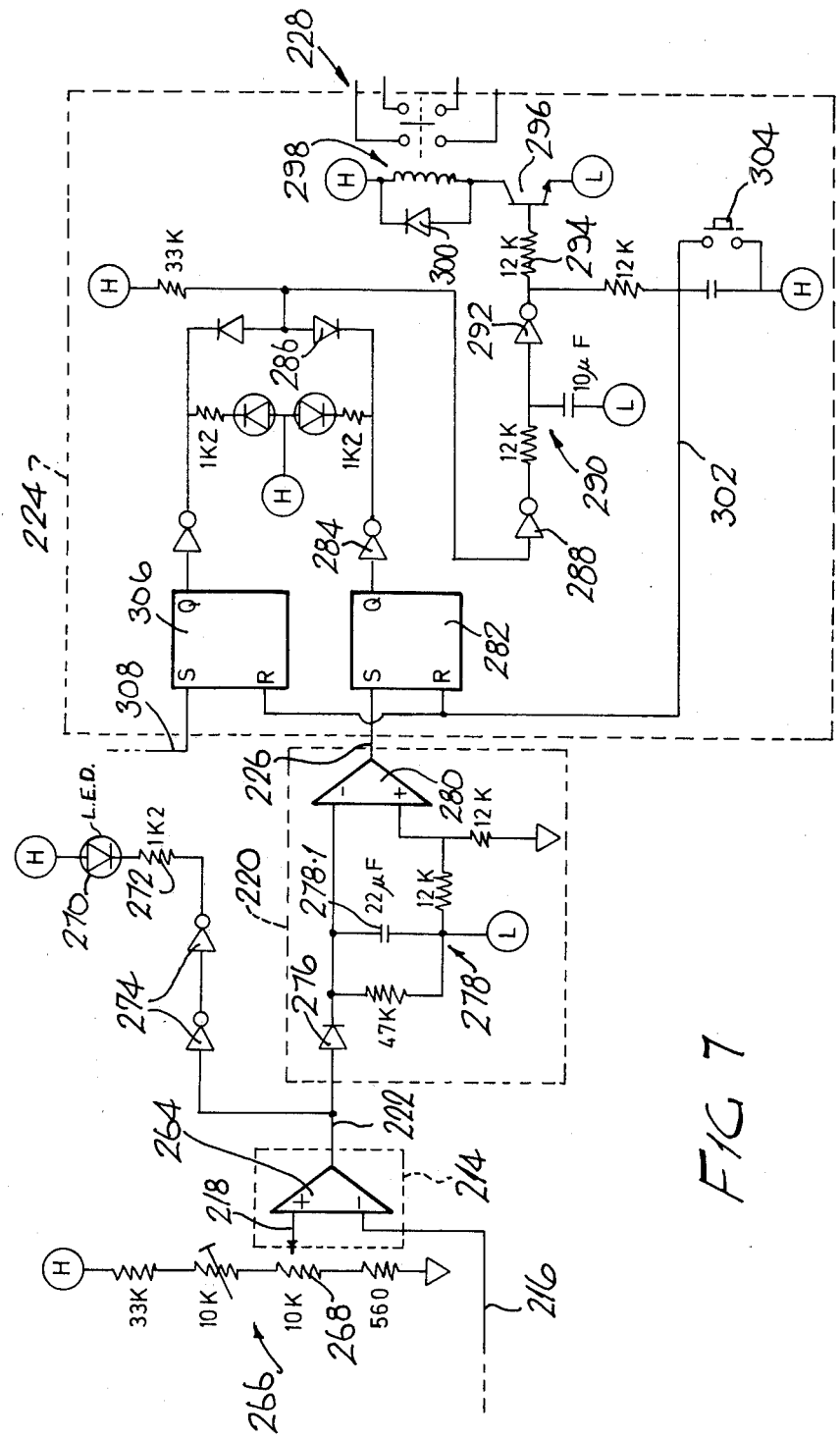

METHOD AND APPARATUS FOR MONITORING POLY-PHASE CURRENTS IN POLY-PHASE EQUIPMENT

This invention relates to the monitoring of poly-phase currents in poly-phase equipment. More particularly, it relates to a method of monitoring currents in poly-phase equipment and to a monitoring device for use in carrying out the method. The invention finds particular application in the field of overload, unbalance, earth fault, and short circuit protection of electrical equipment.

According to the invention there is provided a method of monitoring poly-phase currents in poly-phase equipment, which method includes obtaining a phase signal representative of the current in each of the phases of the equipment, multiplexing the phase signals so as to obtain a single multiplexed signal, and then processing the multiplexed signal to extract therefrom an output signal or signals representative of a predetermined condition or conditions of current flow in the equipment.

The predetermined condition or conditions may, for example, be the existence and/or degree of overload beyond a predetermined full load current, the existence and/or degree of earth fault current, the existence and/or degree of unbalance of the poly-phase currents, and/or the existence of a short circuit.

The multiplexing may take place on a time division basis.

The multiplexing rate, when taking place on a time division basis, may be at least ten times the frequency of the poly-phase currents, i.e. the line frequency. For example, the multiplexing rate may be about 60 times the line frequency. Thus, for a line frequency of 50 Hz the multiplexing rate may be about 3 kHz.

The processing may include attenuating or amplifying the multiplexed signal.

Where the phase signals are AC signals, the processing may further include rectifying the multiplexed signal to provide a rectified signal, comparing the rectified signal with a first reference signal, and providing a first fault signal when the magnitude of the rectified signal exceeds that of the first reference signal. The first reference signal may be chosen such that the first fault signal is indicative of a short circuit fault condition in the equipment.

The processing may further include averaging the rectified signal over at least several cycles of the line frequency to provide a time averaged signal, comparing the time averaged signal with the rectified signal, and providing a second fault signal when the magnitude of the instantaneous value of the rectified signal exceeds that of the time averaged signal by a predetermined amount. The second fault signal will then be indicative of an unbalance condition in the equipment.

The processing may still further include subtracting a second reference signal from the rectified signal or from the time averaged signal to provide an overload level signal, the second reference signal being representative of a predetermined full load current in the equipment. The magnitude of the overload level signal will then be representative of the degree of overload on the equipment.

The processing may still further include detecting the polarity of the overload level signal to provide an overload warning signal when the polarity thereof is of a predetermined sign. The overload warning signal will then be indicative of the existence of an overload condition on the equipment.

The processing may still further comprise passing the multiplexed signal through a filter adapted to reject frequencies above the line frequency to provide a filtered signal, comparing the filtered signal with a third reference signal, and providing a third fault signal when the magnitude of the filtered signal exceeds the third reference signal. The third fault signal will then be indicative of the existence of an earth fault condition in the equipment.

In another embodiment of the invention the phase signals may be rectified signals.

The DC component of the resultant multiplexed signal may then be filtered out to obtain a filtered signal, and the filtered signal may then be compared with a reference signal to obtain a warning signal when the magnitude of the filtered signal exceeds that of the reference signal. Such warning signal will then be indicative of an unbalance condition in the equipment.

The invention also extends to apparatus for monitoring poly-phase currents in poly-phase equipment, which apparatus comprises a multiplexer for multiplexing phase signals corresponding to the currents in the various phases of the equipment to provide a single multiplexed signal, and processing means for processing the multiplexed signal, thereby to extract therefrom an output signal or signals representative of a predetermined condition or conditions of current flow in the equipment.

The multiplexer may be a time division multiplexer.

Where the phase signals are AC signals, the apparatus may further comprise an AC to DC converter operatively connected to the multiplexer to provide a rectified signal representative of the rectified value of the multiplexed signal. The AC to DC converter may be of the high precision type, i.e. being able to rectify voltages of substantially less than 0.6 V.

The operative connection between the multiplexer and the AC to DC converter may be effected by one of the following, or two or more thereof connected in series: an attenuator, an amplifier, a DC isolating capacitor.

The attenuator and/or the amplifier may have an adjustable attenuation or amplification constant, as the case may be.

The apparatus may further comprise a first comparator for comparing the rectified signal with a first reference signal and for providing a first fault signal when the magnitude of the rectified signal exceeds that of the first reference signal.

The apparatus may further comprise averaging means for averaging the rectified signal over at least several cycles of the line frequency to provide a time averaged signal, and a second comparator operatively connected to the AC to DC converter and to the averaging means for comparing the time averaged signal with the rectified signal and for providing a second fault signal when the magnitude of the instantaneous value of the rectified signal exceeds that of the time averaged signal by a predetermined amount.

The apparatus may further comprise subtracting means operatively connected to the AC to DC converter for subtracting a second reference signal representative of a full load current in the equipment from the rectified signal, thereby to provide an overload level signal.

The apparatus may further comprise a polarity detector operatively connected to the subtracting means to provide an overload warning signal when the polarity of the overload level signal is of a predetermined sign.

The apparatus may further comprise a filter operatively connected to the multiplexer and adapted to reject frequencies above the line frequency, thereby to provide a filtered signal, and a third comparator operatively connected to the filter for comparing the filtered signal with a third reference signal and for providing a third fault signal when the magnitude of the filtered signal exceeds that of the third reference signal.

The filter may comprise two or more low-pass active filters each having a cut-off frequency slightly above the line frequency, connected in series.

According to another embodiment of the invention, the apparatus may comprise, for each phase, an AC to DC converter for rectifying a signal corresponding to the current in that phase of the equipment, thereby to provide rectified phase signals each corresponding in magnitude to the magnitude of the currents in the various phases of the equipment, the multiplexer being operatively connected to the AC to DC converter for multiplexing the rectified phase signals, thereby to provide a multiplexed rectified signal.

The apparatus may further include means for sensing when the magnitude of the AC component of the multiplexed rectified signal exceeds a predetermined value.

Figure 2:
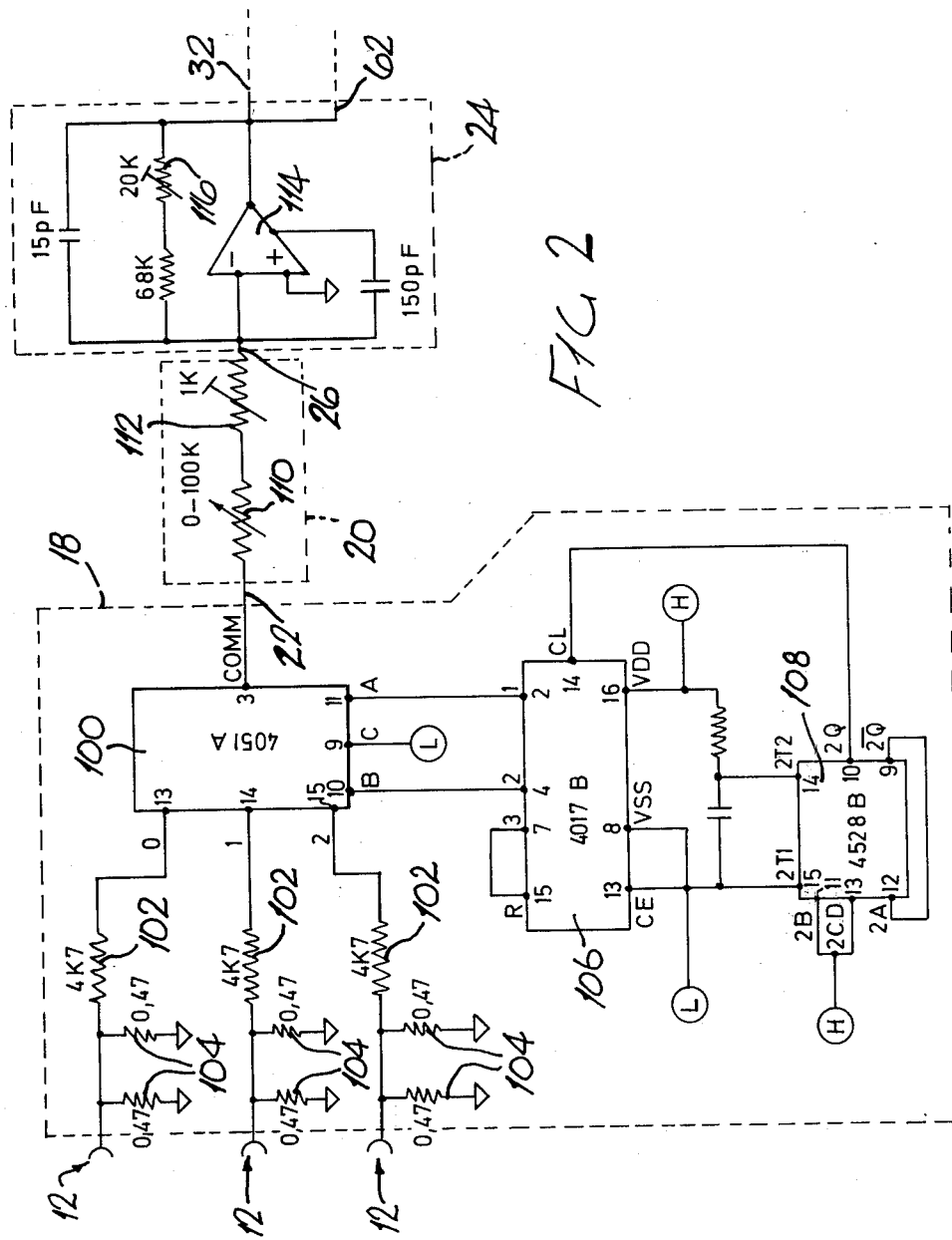
Figure 3:
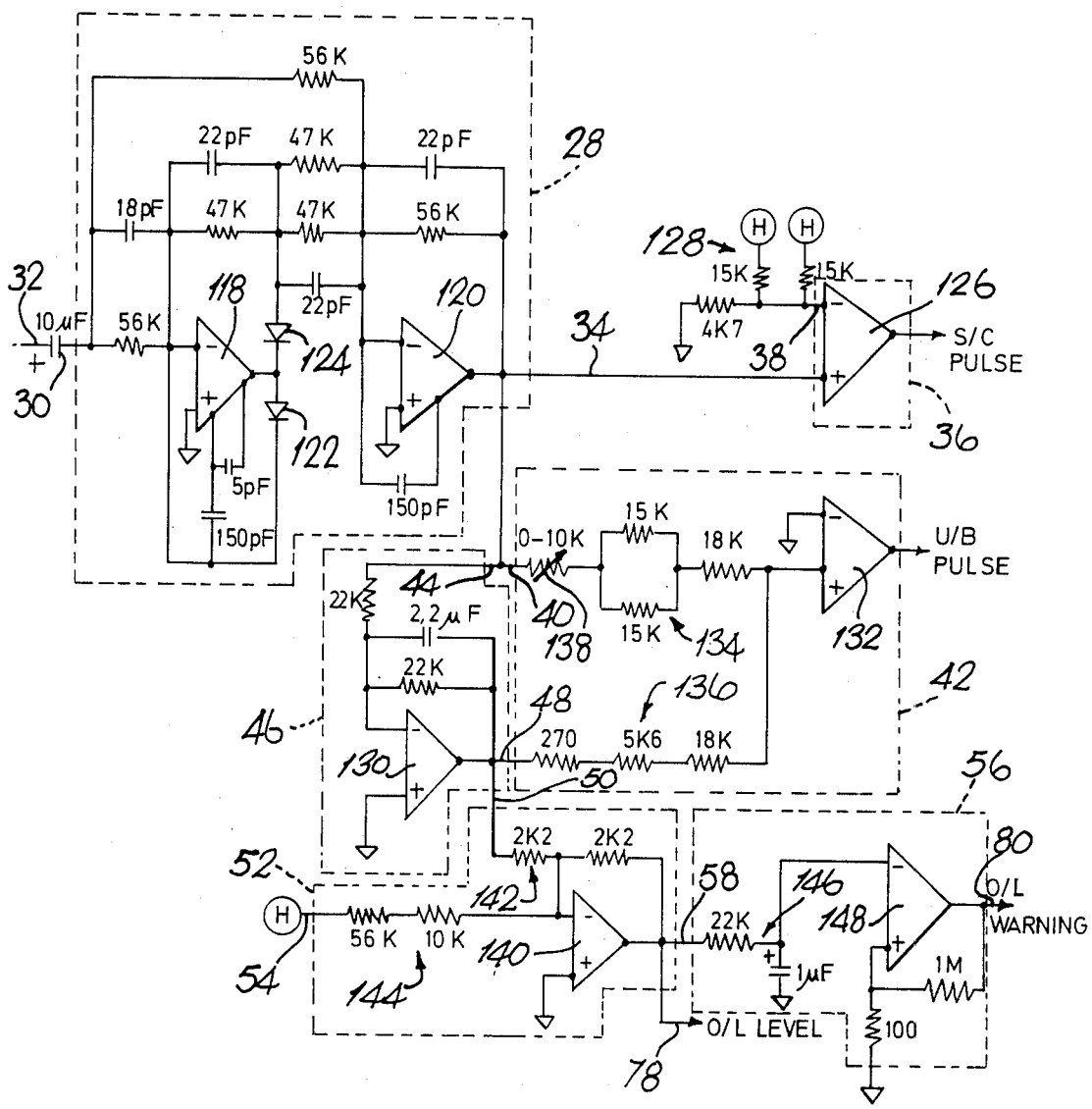
Figure 4:
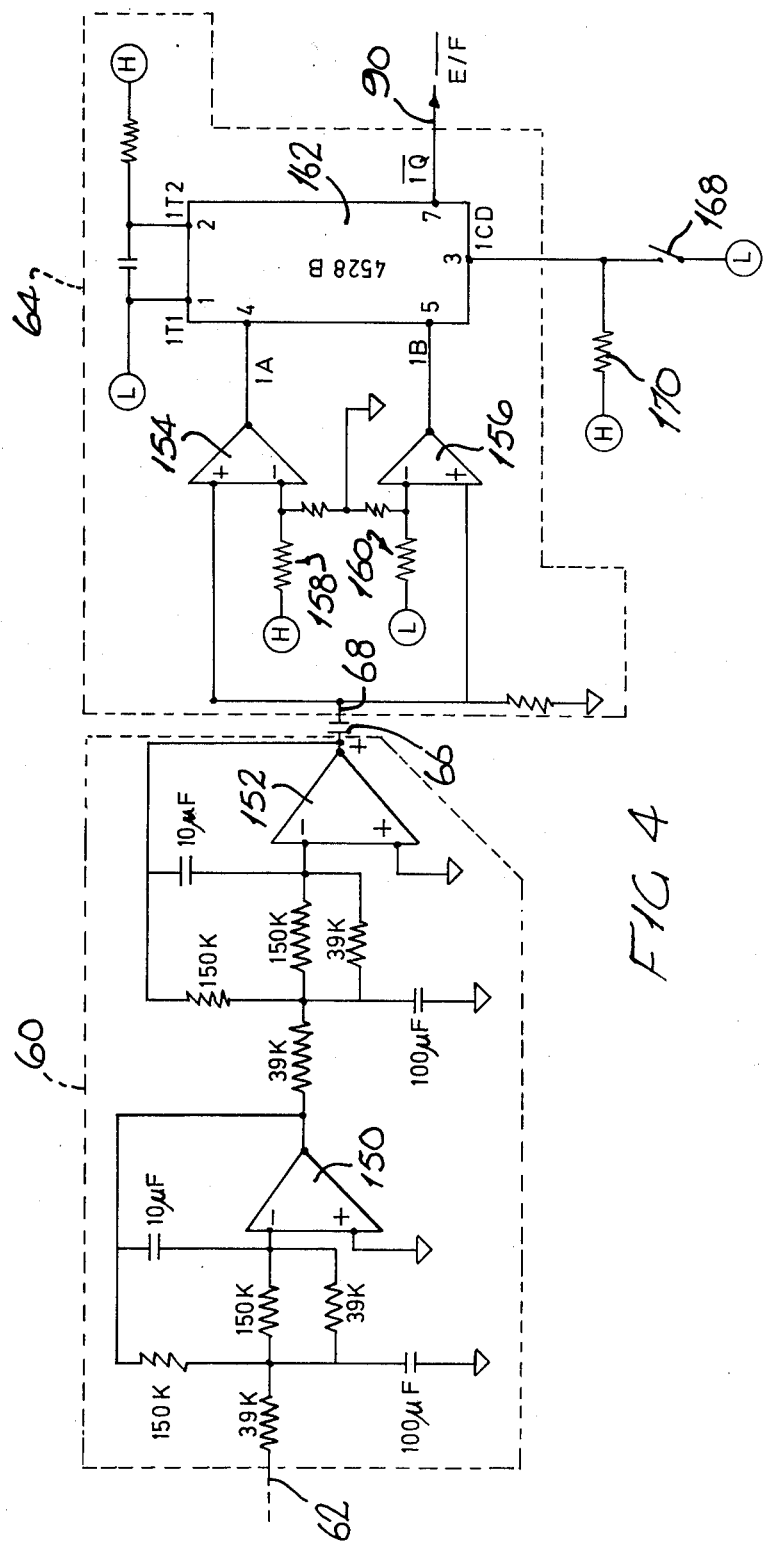
Figure 5:
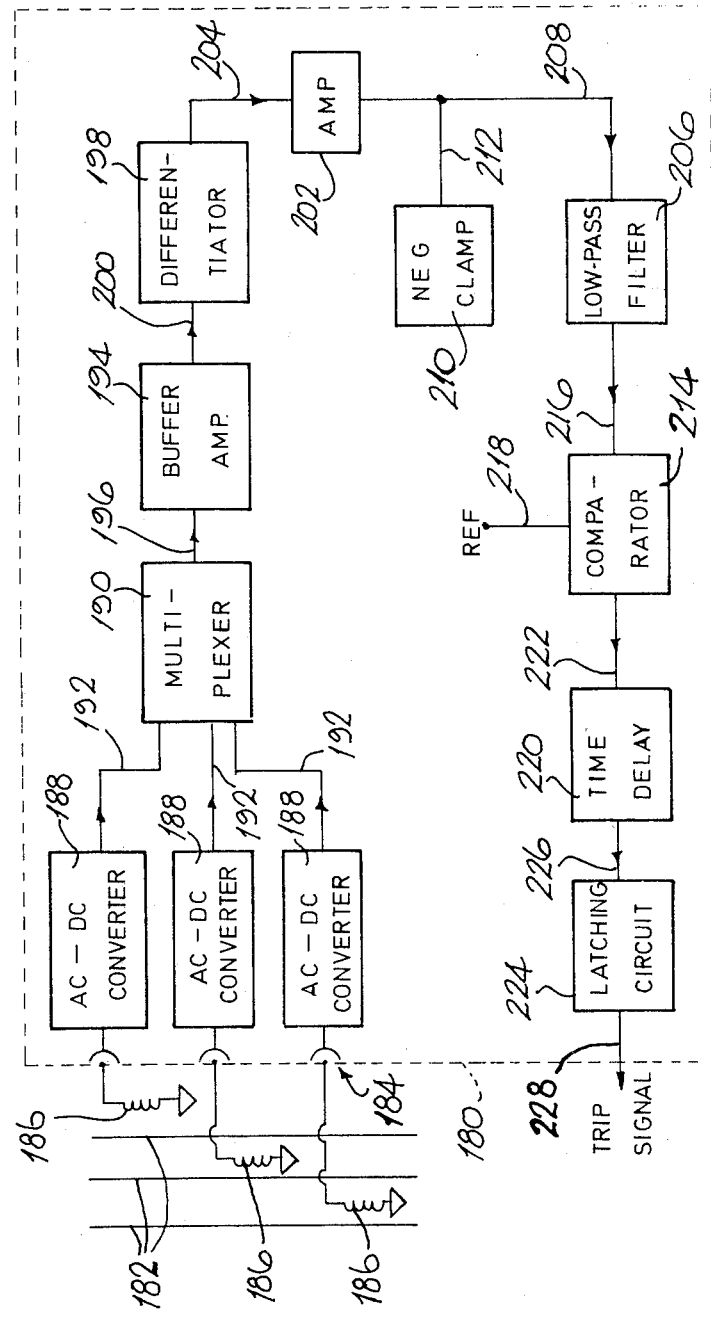

The invention will now be described in more detail, by way of example, with reference to the accompanying drawings:

In the drawings:

FIG. 1 shows a block diagram of apparatus in the form of a protection relay in accordance with one embodiment of the invention;

FIGS. 2 to 4 each show part of the electrical circuitry of the apparatus of FIG. 1 in more detail;

FIG. 5 shows a block diagram of apparatus in the form of a protection relay in accordance with another embodiment of the invention; and FIGS. 6 and 7 each show part of the electrical circuitry of the apparatus of FIG. 5 in more detail.

In FIGS. 2 to 4, 6 and 7 of the drawings, the values of certain of the resistors and capacitors are indicated. An "L" in a circle denotes a connection to a negative supply rail (at a potential of about −6 v) of the circuit, an "H" in a circle denotes a connection to a positive supply rail (at a potential of about +6 v), and a small triangle with one of its apices pointing downwardly denotes a connection to a centre rail having a potential lying midway between that of the "L" and "H" rails.

The integrated circuits used in the relays are of the CMOS integrated circuit family, available from, for example, Motorola or RCA. In the drawings the pin numbers of the integrated circuits are indicated inside the blocks representing the integrated circuits.

In FIG. 1, reference numeral 10 generally indicates a protection relay having three input terminals 12 whereby the relay is connected to three star-connected current transformers 14. The current transformers 14 are each associated with one phase of a three phase feeder 16.

The relay 10 comprises a time division multiplexer 18 to which the three input terminals 12 are connected, an attenuator 20 connected to the output of the multiplexer 18 via a connection 22, and a buffer amplifier 24 connected to the output of the attenuator 20 via a connection 26.

The relay 10 further comprises a precision AC to DC converter or rectifier 28 which is connected via a DC isolating capacitor 30 and a connection 32 to the output of the buffer amplifier 24.

The output of the AC to DC converter 28 is connected via a connection 34 to a first comparator 36, where the output voltage of the AC to DC converter 28 is compared with a fixed first reference voltage applied to the comparator via a connection 38.

The output of the AC to DC converter 28 is further connected directly via a connection 40 to one input of a second comparator 42, and indirectly via a connection 44, an averaging circuit 46, and a connection 48 to the other input of the second comparator 42.

Besides being connected to the comparator 42, the output of the averaging circuit 46 is also connected via a connection 50 to one input of a subtracting circuit 52. A fixed second reference voltage is applied to the other input of the subtracting circuit 52 via a connection 54.

A polarity detector 56 is connected to the output of the subtracting circuit 52 via a connection 58.

A low-pass filter 60 is connected to the output of the buffer amplifier 24 via a connection 62. The output of the low-pass filter 62 is connected to one input of a third comparator 64 via a DC isolating capacitor 66 and a connection 68. A fixed third reference voltage is applied to the other input of the comparator 64 via a connection 70.

Finally, the relay 10 comprises a processor 72. The output of the first comparator 36 is connected to the processor via a short circuit signal line 74, the output of the second comparator 42 via an unbalance signal line 76, the output of the subtracting circuit 52 via an overload level signal line 78, the output of the polarity detector 56 via an overload warning signal line 80, and the output of the third comparator 64 via an earth fault signal line 90. The output of the processor 72 leads via a connection 92 to the trip coil (not shown) of a circuit breaker (also not shown) arranged in the three phase line 16.

Referring now to FIG. 2, reference numeral 100 indicates a 4051A integrated circuit, which is an eight channel digitally controlled analogue switch. Only three of the channels, namely "0", "1", and "2" are used so that only two of the channel select inputs, namely "A" and "B" are required. The channel select input C is tied to the negative supply rail.

Each of the channels "0", "1", "2" of the circuit 100 is connected to a respective terminal 12 via a resistance 102, each terminal 12 having further connected to it a parallel pair of shunt resistances 104 for the respective current transformers 14 (see FIG. 1). The common output terminal COMM of the circuit 100 is connected to the connection 22.

The circuit 100 is switched by means of a 4017B integrated circuit 106 and a first part 108 of a 4528B integrated circuit. The circuit 106 is a decade counter which has been connected to operate as a three-stage ring counter by connecting its "3" terminal to its reset terminal R. Its VDD terminal is connected to the positive rail and its VSS terminal to the negative rail. Its clock enable terminal CE is tied to the negative rail so as permanently to enable its clock input terminal CL. The circuit 108 is a multivibrator circuit which has been connected to operate as an astable multivibrator having a switching frequency of about 3 kHz. Its output terminal 2Q is connected to the clock terminal CL of the circuit 106.

The attentuator 20 comprises a variable resistor 110 connected in series with a preset resistor 112.

The buffer amplifier 24 comprises an operational amplifier 114 which is connected to have a fixed preset gain. The gain of the buffer amplifier 24 may be set by adjusting a preset resistor 116 in its feedback loop.

Referring now to FIG. 3, the AC to DC converter 28 comprises a pair of operational amplifiers 118 and 120 and a pair of diodes 122 and 124 which are connected in a configuration known per se to form a high precision full-wave rectifier. The converter is termed "high precision" because it is able to rectify very small voltages, unlike an ordinary rectifier bridge which, if it makes use of silicon diodes, is not able to pass voltages of less than about 0.6 v. Thus, the converter will provide at its output 34 a voltage which is a full-wave rectified version of the voltage passed by the capacitor 30, even for voltages of substantially less than 0.6 v.

The comparator 36 comprises an operational amplifier 126 of which one input terminal is connected to the output of the AC to DC converter 28 via the connection 34 and of which the other input terminal is maintained via the connection 38 at the predetermined first reference voltage by means of a voltage dividing network 128 connected between the positive rail and the centre rail.

The averaging circuit 46 comprises an operational amplifier 130 which is connected as an inverting, low-pass active filter having a very low cut-off frequency of about 3 Hz, thus effectively providing a DC signal of negative potential at its output 48. The magnitude of the DC signal will be representative of the average value, over several cycles of the line frequency of the output of the AC to DC converter 28.

The comparator 42 comprises an operational amplifier 132 which is connected as a summing circuit having a pair of resistive input legs 134 and 136, both connected to one of the inputs of the operational amplifier 132. The other input of the operational amplifier 132 is tied to the centre rail. The resistance of the leg 134 is adjustable by means of a variable resistor 138 which forms part of that leg.

The output of the AC to DC converter 28 is directly connected to the leg 134 via the connection 40, and indirectly via the averaging circuit 46 and the connection 48 to the leg 136. As the averaging circuit 46 provides an inverted value of the average of the AC to DC converter 28 output, and as the operational amplifier 132 is connected as a summing circuit, the output of the operational amplifier 132 will be representative of the difference between the average and the instantaneous values of the output of the AC to DC converter 28.

The subtracting circuit 52 comprises an operational amplifier 140 which is connected as a summing and polarity reversing circuit. The output of the averaging circuit 46 is connected via the connection 50 to one leg 142 of the summing circuit, the other leg 144 of the summing circuit being tied to the positive rail via the connection 54.

The polarity detector 56 comprises a smoothing circuit 146 and an operational amplifier 148 which is connected to have hysteresis action. This provides the polarity detector 56 with positive action so that the output of the operational amplifier 148 does not float between positive and negative values when the output of the subtracting circuit 52 varies closely around zero potential.

Referring now to FIG. 4, the low-pass filter 60 comprises a pair of series connected, multiple feedback, low-pass active filters having operational amplifiers 150 and 152 respectively. The filter 60 is arranged to have a sharp cut-off just beyond the line frequency (which will normally be 50 or 60 Hz). This will provide at its output a sine wave of a frequency equal to the line frequency and an amplitude proportional to the amount of earth fault current flowing in the various phases of the line 16.

The third comparator 64 comprises two operational amplifiers 154 and 156 connected back-to-back as comparator circuits. The reference voltage for the operational amplifier 154 is provided by a voltage divider circuit 158 which is tied to the positive rail, and the reference voltage for the operational amplifier 156 is provided by a voltage divider circuit 160 which is tied to the negative rail. In this arrangement the operational amplifier 154 will detect when the signal passed by the capacitor 66 exceeds a positive reference level, and the operational amplifier 156 will detect when that signal falls below a negative reference level.

The outputs of the operational amplifiers 154 and 156 are connected to the 1A and 1B trigger terminals respectively of a second part 162 of the 4528B integrated circuit (of which the other part is shown at 108 in FIG. 2). The circuit 162 is also a multivibrator circuit, but in this case it is connected as a monostable multivibrator circuit having an "on" time of slightly longer than ½ cycle of the line frequency.

The $\overline{1Q}$ terminal of the circuit 162 is connected via the earth fault signal line 90 to the processor 72. The 1CD terminal is connected to the negative rail via an "earth fault off" switch 168, and is further connected via a resistor 170 to the positive rail.

Having now described the circuit 162 and its connection, reference is again made to FIG. 3. The output of the operational amplifier 126, like that of the operational amplifiers 154 and 156 in FIG. 4, is connected to the trigger terminal A of a monostable multivibrator (not shown). The monostable multivibrator has an "on" time of slightly longer than ½ cycle of the line frequency, and the $\overline{Q}$ output terminal thereof is connected via the connection 74 (FIG. 1) to the processor 72. Similarly, the output of the operational amplifier 132 is connected to the trigger terminal A of a further monostable multivibrator, and the $\overline{Q}$ output terminal thereof is connected via the connection 76 to the processor 72.

The operation of the relay 10 is as follows. When current flows through the various phases of the three phase line 16, corresponding currents flow in the current transformers 14 and the shunt resistors 104. This causes a voltage to be applied to each of the channel "0", "1", and "2" of the circuit 100, which voltages correspond respectively to the instantaneous values of the currents in the various phases. The circuits 106 and 108 cause the three channels to be scanned cyclically at a rate of 3 kHz, thus causing a time division multiplexed signal representing the three currents in the phases to appear on the common output terminal COMM. This signal is attenuated or amplified depending on the setting of the variable resistor 110. The variable resistor is graduated to indicate the line current which is to be considered by the relay as full load current.

Any DC component in the signal from the output of the buffer amplifier 24 is removed by the DC isolating capacitor 30 and the AC signal which remains is passed through the AC to DC converter 28. At the output of the AC to DC converter there will thus appear a series of pulses at a rate of 3 kHz, each third pulse representing the instantaneous value of the load current flowing in one of the three phases of the line 16. The arrangement of the circuitry and the graduations on the variable resistor 110 are such that, when full load current as set on the variable resistor 110 is reached, the average output of the AC to DC converter 28 (at the connection 34) will be about 200 mV.

The reference voltage on the comparator 36 is such that, when the output of the AC to DC converter exceeds about ten or eleven times the full load value, which would represent a short circuit on one or more of the phases, then the output of the operational amplifier switches sharply from a negative value to a positive value. This will trigger the monostable multivibrator (referred to above but not shown in the drawings). This causes a short circuit signal to be fed to the processor 72 via the connection 74.

If there is an unbalance in the phases, then there will be a peak or a dip in the output of the AC to DC converter 28 at every ½ cycle of the line frequency (i.e. at a frequency of 100 kHz for a line frequency of 50 Hz). As the cut-off frequency of the averaging circuit 46 is substantially lower than the line frequency, these dips or peaks will not be noticeable on the connection 48. The comparator 42 compares the average value on the connection 48 with the instantaneous value on the connection 40, and as soon as the instantaneous value exceeds the average value by a predetermined amount, the output of the operational amplifier 132 will rise rapidly to a positive value. The degree of unbalance at which the comparator 42 operates may be set on the variable resistor 138 which may, for this purpose, be suitably graduated. The output of the operational amplifier then triggers the monostable multivibrator (referred to above but not shown in the drawings). This causes an unbalance signal to be fed to the processor 72 via the connection 76.

The output of the averaging circuit 46 which represents the negative of the average load current in the various phases has its polarity reversed again by the operational amplifier 140 in the subtracting circuit 52. However, due to the second leg 144 which is tied to the positive rail, a fixed reference voltage is subtracted in the subtracting circuit. The reference voltage is chosen such that at full load current, the output of the operational amplifier 140 is zero. Thus, for a load current of less than full load current as set on the variable resistor 110, the output of the operational amplifier 140 will be negative, whereas for a load exceeding the full load current, it will be positive.

The output of the operational amplifier 140 is fed to the processor 72 as representative of the overload level or degree of overload in the line 16.

As soon as the output of the operational amplifier 140 becomes positive, the output of the operational amplifier 148 will rapidly rise to a positive value. This signal is fed to the processor 72 as an indication that full load is being exceeded.

If there is an earth fault current flowing in the line 16, then, as mentioned above, a sine wave of line frequency and of an amplitude proportional to the amount of earth fault current flowing, appears at the output of the low-pass filter 60. This is passed by the coupling capacitor 66 to the comparator 64. As soon as the earth fault current exceeds a predetermined maximum value, the comparator operates to feed an earth fault signal to the processor 72 via the connection 90. As the comparator is able to detect both negative and positive parts of the sine wave, an earth fault can be detected within ½ cycle of the line frequency.

The processor may be of any suitable type to provide a trip signal depending on the value of the signals it receives. It may for example include a timing circuit to provide a trip signal on the connection 92 after a time delay which depends on the magnitude of the load current from the time that the load current exceeded the full load current.

It is an advantage of the relay described above that, by multiplexing the signals corresponding to the currents in the various phases, only a single signal representing the currents in all three phases need be processed, reducing the amount of circuitry that would have been needed if separate signals representing each of the currents had to be processed separately. It also simplifies adjustment of the various settings of the relay, only one adjustment being required for all three phases.

Referring now to FIG. 5, reference numeral 180 generally indicates apparatus in the form of a protection relay for detecting and responding to unbalance conditions on a three phase feeder 182. The relay has three input terminals 184 whereby it can be connected to three star-connected current transformers 186, each associated with one of the phases of the feeder.

The relay 180 has three AC to DC converters 188 each connected to one of the input terminals 184. The relay further has a multiplexer 190 which has three inputs, each connected to one of the AC to DC converters via a connection 192.

The output of the multiplexer 190 is connected to a buffer amplifier 194 via a connection 196, and the output of the buffer amplifier is in turn connected to a differentiator 198 via a connection 200. The output of the differentiator 198 is connected to an amplifier 202 via a connection 204. The output of the amplifier 202 is connected to a low-pass filter 206 via a connection 208. The output of the amplifier 202 is further connected to a negative clamping circuit 210 via a connection 212, the clamping circuit serving to prevent the output of the amplifier 202 from going negative.

The output of the low-pass filter 206 is connected to a comparator 214 via a connection 216. In the comparator 214 the output of the low-pass filter 206 is compared with a reference voltage fed to the comparator via a connection 218.

The output of the comparator 214 is connected to a time delay circuit 220 via a connection 222. The output of the time delay circuit 220 is in turn connected to a latching circuit 224 via a connection 226. The latching circuit provides a trip signal on its output connection 228, as will be described in more detail later in the specification, for tripping a circuit breaker (not shown) connected in the feeder 182.

Referring now to FIG. 6, the AC to DC converters 188 are all identical. They are different from the AC to DC converter 28 described with reference to FIGS. 1 to 4 of the drawings in that they provide only half wave rectification and in that they provide a smoothed output corresponding to the peak value of the respective currents in the feeder. A shunt resistor 230 for the current transformers 186 is connected to each of the input terminals 184. Rectification is provided by a feedback amplifier having an operational amplifier 232 and a diode 234 in its forward loop. The smoothing referred to above is provided by a capacitor 236 connected to the output of the feedback amplifier. The operational amplifiers 232 are each protected against overvoltage by a zener diode 238.

The multiplexer 190 comprises a 4066 integrated circuit 240. This is an electronic four channel analogue switch of which only three channels are used. The connections 192 are connected to the inputs of the three analogue switches. The outputs of these analogue switches are connected in common to the connection 196.

The circuit 240 is operatively connected to a 4017 integrated circuit 242 for cyclically switching the three analogue switches of the circuit 240 used. The circuit 242 is a decade counter circuit of which only three successive outputs are used, the other outputs being bypassed. The circuit 242 is advanced by clock pulses from a 555N integrated circuit 244 which has been connected as an astable multivibrator with a frequency of about 1.2 kHz, the clock output terminal thereof being connected to the clock terminal of the circuit 242 via a connection 246.

The buffer amplifier 194 comprises an operational amplifier 248 with unity feedback.

The differentiator 198 is in the form of an R-C network having a capacitor 250 and a resistor 252.

The amplifier 202 comprises an operational amplifier 254 with resistive feedback.

The negative clamping circuit 210 comprises an operational amplifier 256 having one input thereof tied to the centre rail, and having a diode 258 as feedback element.

The low-pass filter 206 is in the form of an R-C network having a resistor 260 and a capacitor 262.

Referring now to FIG. 7, the comparator 214 is in the form of an operational amplifier 264 having its one input connected to the connection 216 from the low-pass filter 206. The reference voltage is provided by a voltage divider 266 connected between the positive and centre rails. It includes a potentiometer 268 having its slider connected via the connection 218 to the other input of the operational amplifier 264. The output of the operational amplifier 264 is connected to the connection 222. In order to provide a visual indication of an unbalance condition, a light emitting diode 270 is connected to the output of the operational amplifier 264 via a ballast resistor 272 and a pair of series connected inverters 274.

The time delay circuit 220 comprises a diode 276 and an R-C network generally indicated at 278 and comprising a capacitor 278.1, via which an operational amplifier 280 is connected to the connection 222. The output of the operational amplifier 280 is connected to the connection 226. The time delay circuit provides a time delay of about 4 seconds.

The latching circuit 224 comprises a bistable multivibrator 282, the set terminal S of which is connected to the connection 226. The Q terminal thereof is connected via an inverter 284, a gating diode 286, a further inverter 288, an R-C smoothing circuit 290, yet a further inverter 292, and a resistor 294 to the base of a switching transistor 296. A relay 298 is connected to the collector of the transistor 296, the contacts of the relay being connected to the connections 228 for providing a tripping signal. A free-wheeling diode 300 is connected across the coil of the relay 298.

In order to enable the bistable multivibrator 282 to be reset, its reset terminal R is connected by means of a connection 302 to the positive rail via a reset button 304.

The latching circuit comprises a further bistable multivibrator 306 with associated circuitry for switching and latching the relay 298. This may be used to switch the relay in response, for example, to an overload signal fed to the S terminal of the circuit 306 via a connection 308. The circuitry for obtaining the overload signal does not form part of the present invention and is therefore not shown or described.

In operation, currents flowing through the current transformers 186 cause voltages corresponding to the currents in the various phases of the feeder 182 to appear across the shunt resistors 230. There voltages are amplified, rectified and smoothed by the AC to DC converters 188 and then fed to the multiplexer 190. There the various voltages are multiplexed on a time division basis at the rate of about 1.2 kHz, i.e. the frequency of the circuit 244. The DC component of this multiplexed signal is removed in the differentiator 198.

Under balanced conditions in the feeder 182, the multiplexed signal will have substantially no AC component. There will therefore be no output voltage on the connection 204. Under unbalance conditions there will, however, be a dip or peak in the output voltage on the connection 204 once every third cycle of the multiplexing signal provided by the circuit 244. This will cause an alternating signal having a frequency of $\frac{1}{3}$rd the multiplexing frequency to appear at the output of the differentiator 198. This alternating signal is amplified by the amplifier 202 and the negative wave halves removed by the negative clamping circuit 210. The low-pass filter 206 which has a cut-off frequency substantially below the line frequency is effective to smooth the passed positive wave halves and the resulting voltage is compared with the reference voltage fed to the comparator 214 via the connection 218. When the voltage exceeds the reference voltage, the output voltage of the comparator rapidly drops to the voltage of the negative rail, causing the light emitting diode 270 to turn on and permitting the capacitor 278.1 of the R-C network 278 to discharge. After a time delay of about four seconds, the output of the operational amplifier 280 will switch to the positive supply rail and set the bistable circuit 282. When the bistable circuit 282 is set, the transistor 296 will switch off, thus causing the tripping contacts thereof to operate.

During normal conditions, the relay 298 is energized so that the system will fail to safety in case of a power failure.

In order to reset the bistable circuit 282, the reset button 304 is depressed. This will again cause the transistor 296 to be switched on, thereby energizing the relay 298.

I claim:

1. A method of protecting poly-phase alternating current equipment against undesired conditions of current flow in the equipment, which method comprises obtaining, in respect of each phase of the equipment, a phase signal representative of the current in that phase, multiplexing the phase signals on a time division basis at a rate of at least several times the line frequency of the alternating currents in the equipment so as to obtain a single multiplexed signal, processing the multiplexed signal without de-multiplexing it to extract therefrom an output signal representative of a predetermined undesired condition of current flow in the equipment, and, in response to generation of said output signal, tripping the equipment.

2. A method as claimed in claim 1, wherein the multiplexing rate is at least ten times the line frequency.

3. A method as claimed in claim 2, wherein the multiplexing rate is about 60 times the line frequency.

4. A method as claimed in claim 1, wherein said processing includes attenuating the multiplexed signal.

5. A method as claimed in claim 1, wherein the phase signals are alternating signals, each representative of the instantaneous current in the respective phase of the equipment, and wherein said processing includes rectifying the multiplexed signal to provide a rectified signal, comparing the rectified signal with a first reference signal, and providing said output signal when the magnitude of the rectified signal exceeds that of the first reference signal.

6. A method as claimed in claim 1, wherein the phase signals are alternating signals, each representative of the instantaneous current in the respective phase of the equipment, and wherein the processing includes rectifying the multiplexed signal to provide a rectified signal, averaging the rectified signal over at least several cycles of the line frequency to provide a time averaged signal, comparing the time averaged signal with the rectified signal, and providing said output signal when the magnitude of the instantaneous value of the rectified signal exceeds that of the time averaged signal by a predetermined amount.

7. A method as claimed in claim 1, wherein the phase signals are alternating signals, each representative of the instantaneous current in the respective phase of the equipment, and wherein the processing includes rectifying the multiplexed signal to provide a rectified signal, averaging the rectified signal over at least several cycles of the line frequency to provide a time averaged signal, and subtracting a second reference signal from the time averaged signal to provide said output signal, the second reference signal being representative of a predetermined full load current in the equipment and said output signal being representative of the degree of which the current flow in the equipment exceeds the predetermined full load current.

8. A method as claimed in claim 7, wherein the processing further includes detecting the polarity of the output signal to provide an overload warning signal when the polarity thereof is of a predetermined sign.

9. A method as claimed in claim 1, wherein the processing comprises passing the multiplexed signal through a filter adapted to reject frequencies above the line frequency to provide a filtered signal, comparing the filtered signal with a third reference signal, and providing said output signal when the magnitude of the filtered signal exceeds the third reference signal.

10. A method as claimed in claim 1, wherein the phase signals are rectified signals, wherein the DC component of the resultant multiplexed signal is filtered out to obtain a filtered signal, and wherein the filtered signal is then compared with a reference signal to provide said output signal when the magnitude of the filtered signal exceeds that of the reference signal.

11. A method as claimed in claim 1, wherein said processing includes amplifying the multiplexed signal.

12. Apparatus for use in carrying out the method claimed in claim 1, which apparatus comprises a plurality of input terminals each for receiving a phase signal representative of the current in a respective phase of said equipment, an electronically operable multiplexer operatively connected to the input terminals for multiplexing the phase signals on a time division basis to provide a single multiplexed signal, processing means for processing the multiplexed signal without de-multiplexing it to extract therefrom an output signal representative of a predetermined undesired condition of current flow in the equipment, an output terminal, and means for providing a tripping signal on the output terminal in response to generation of said output signal, the tripping signal being capable of being used for tripping the equipment.

13. Apparatus as claimed in claim 12, wherein the processing means includes rectifying means for rectifying the multiplexed signal so as to provide a rectified signal, averaging means for averaging the rectified signal over at least several cycles of the line frequency to provide a time averaged signal, and a second comparator operatively connected to the rectifying means and to the averaging means for comparing the time averaged signal with the rectified signal and for providing said output signal when the magnitude of the instantaneous value of the rectified signal exceeds that of the time averaged signal by a predetermined amount.

14. Apparatus as claimed in claim 13, wherein the rectifying means is a high precision AC to DC converter.

15. Apparatus as claimed in claim 12, wherein the processing means includes rectifying means for rectifying the multiplexed signal so as to provide a rectified signal, averaging means for averaging the rectified signal over at least several cycles of the line frequency so as to provide a time averaged signal, and subtracting means operatively connected to the averaging means for subtracting a second reference signal representative of a full load current in the equipment from the time averaged signal, thereby to provide said output signal.

16. Apparatus as claimed in claim 15, wherein the rectifying means is a high precision AC to DC converter.

17. Apparatus as claimed in claim 15, wherein the processing means further includes a polarity detector operatively connected to the subtracting means to provide an overload warning signal when the polarity of the output signal is of a predetermined sign.

18. Apparatus as claimed in claim 12, wherein the processing means includes a filter operatively connected to the multiplexer and adapted to reject frequencies above the line frequency, thereby to provide a filtered signal, and a third comparator operatively connected to the filter for comparing the filtered signal with a third reference signal and for providing said output signal when the magnitude of the filtered signal exceeds that of the third reference signal.

19. Apparatus as claimed in claim 18, wherein the filter comprises two or more low-pass active filters each having a cut-off frequency slightly above the line frequency, connected in series.

20. Apparatus as claimed in claim 12 which further comprises, for each phase, rectifying means for rectifying an alternating signal corresponding to the instantaneous value of the current in that phase of the equipment, thereby to provide rectified phase signals each corresponding in magnitude to the magnitude of the currents in the various phases of the equipment, the multiplexer being operatively connected to the rectifying means for multiplexing the rectified phase signals, thereby to provide said multiplexed signal as a multiplexed rectified signal.

21. Apparatus as claimed in claim 20, which further includes means for sensing when the magnitude of the AC component of the multiplexed rectified signal exceeds a predetermined value.

22. Apparatus as claimed in claim 12, which further comprises an amplifier connected in series with the multiplexer for amplifying the multiplexed signal.

23. Apparatus as claimed in claim 22, wherein the amplifier has an adjustable amplification constant.

24. Apparatus as claimed in claim 12, which further comprises an attenuator connected in series with the multiplexer for attenuating the multiplexed signal.

25. Apparatus as claimed in claim 24, wherein the attenuator has an adjustable attenuation constant.

26. Apparatus as claimed in claim 12, wherein the processing means includes rectifying means for rectifying the multiplexed signal so as to provide a rectified signal, and a first comparator for comparing the magnitude of the rectified signal with a reference signal and for providing said output signal when the magnitude of the rectified signal exceeds that of the first reference signal.

27. Apparatus as claimed in claim 26, wherein the rectifying means is a high precision AC to DC converter.

28. Apparatus for monitoring polyphase alternating currents in polyphase alternating current equipment, which apparatus comprises a plurality of input terminals each for receiving an alternating phase signal representative of the instantaneous current in a respective phase of the equipment, a multiplexer connected to the input terminals for multiplexing the phase signals on a time division basis at a rate of at least several times the line frequency of the alternating currents in the equipment, and thereby provide a single multiplexed signal, rectifying means for rectifying the multiplexed signal to provide a rectified signal, averaging means for averaging the multiplexed signal over at least several cycles of the line frequency to provide a time averaged signal, an output terminal, and a comparator for comparing the rectified signal with the time averaged signal and for providing an output signal on the output terminal when the magnitude of the instantaneous value of the rectified signal exceeds that of the time averaged signal.

29. Apparatus for monitoring polyphase alternating currents in polyphase alternating current equipment, which apparatus comprises a plurality of input terminals each for receiving an alternating phase signal representative of the instantaneous current in a respective phase of the equipment, a multiplexer connected to the input terminals for multiplexing the phase signals on a time division basis at a rate of at least several times the line frequency of the alternating currents in the equipment, and thereby provide a single multiplexed signal, a filter operatively connected to the multiplexer and adapted to reject frequencies above the line frequency, thereby to provide a filtered signal, an output terminal, and a comparator operatively connected to the filter for comparing the filtered signal with a third reference signal and for providing an output signal on the output terminal when the magnitude of the filtered signal exceeds that of the reference signal.

30. A method of monitoring polyphase alternating currents in polyphase alternating current equipment, which method comprises obtaining, in respect of each phase of the equipment, an alternating phase signal representative of the instantaneous current in that phase, multiplexing and rectifying the phase signals to provide a single multiplexed and rectified signal, said multiplexing taking place on a time division basis and at a rate of at least several times the line frequency of the alternating currents in the equipment, averaging the multiplexed and rectified signal over at least several cycles of the line frequency to provide a time averaged signal, comparing the time averaged signal with the multiplexed and rectified signal, and providing an output signal when the magnitude of the instantaneous value of the multiplexed and rectified signal exceeds that of the time averaged signal by a predetermined amount.

31. A method of monitoring polyphase alternating currents in polyphase alternating current equipment, which method comprises obtaining, in respect of each phase of the equipment, an alternating phase signal representative of the instantaneous current in that phase, multiplexing the phase signals on a time division basis at a rate of at least several times the line frequency of the alternating currents in the equipment so as to obtain a single multiplexed signal, passing the multiplexed signal through a filter adapted to reject frequencies above the line frequency so as to provide a filtered signal, comparing the filtered signal with a reference signal, and providing an output signal when the magnitude of the filtered signal exceeds the reference signal.

* * * * *